(12) United States Patent
Lucas

(10) Patent No.: US 8,979,084 B2
(45) Date of Patent: Mar. 17, 2015

(54) ANTI-BOUNCE DEVICE

(75) Inventor: Warren Geoffrey Lucas, Wooragee (AU)

(73) Assignee: Pilot Pastoral Co. Pty Ltd, Victoria (AU)

( * ) Notice: Subject to any disclaimer, the term of this patent is extended or adjusted under 35 U.S.C. 154(b) by 991 days.

(21) Appl. No.: 13/124,807

(22) PCT Filed: Oct. 23, 2009

(86) PCT No.: PCT/AU2009/001395
§ 371 (c)(1),
(2), (4) Date: Apr. 18, 2011

(87) PCT Pub. No.: WO2010/045688
PCT Pub. Date: Apr. 29, 2010

(65) Prior Publication Data
US 2011/0278780 A1 Nov. 17, 2011

(30) Foreign Application Priority Data

Oct. 24, 2008 (AU) ................................ 2008905495

(51) Int. Cl.
*B23Q 1/64* (2006.01)
*B26D 1/18* (2006.01)
*B27B 5/38* (2006.01)
*B23D 47/00* (2006.01)
*B23D 47/02* (2006.01)
*B27B 7/00* (2006.01)

(52) U.S. Cl.
CPC ................ *B27B 5/38* (2013.01); *B23D 47/005* (2013.01); *B23D 47/02* (2013.01); *B27B 7/00* (2013.01)

USPC ............................................... 269/56; 83/485

(58) Field of Classification Search
CPC ........ B26D 1/185; B26D 1/205; B27B 5/201; B23D 45/021
USPC ......................... 269/97; 144/378; 83/485–489
See application file for complete search history.

(56) References Cited

U.S. PATENT DOCUMENTS

| 566,624 A | * | 8/1896 | Sager | 83/488 |
| 1,842,114 A | * | 1/1932 | Pratt | 83/488 |
| 1,846,641 A | * | 2/1932 | Hedgpeth | 83/574 |
| 3,695,316 A | * | 10/1972 | Pluckhahn | 30/381 |
| 4,235,140 A | * | 11/1980 | Reece | 83/794 |
| 4,290,330 A | * | 9/1981 | Washio et al. | 83/820 |
| 4,416,312 A | * | 11/1983 | Ostberg | 144/39 |
| 4,678,204 A | * | 7/1987 | Hetherington | 280/124.17 |
| 4,881,584 A | * | 11/1989 | Wislocker et al. | 144/39 |

(Continued)

*Primary Examiner* — Lee D Wilson
*Assistant Examiner* — Jamal Daniel
(74) *Attorney, Agent, or Firm* — Garvey, Smith, Nehrbass & North, L.L.C.; Seth M. Nehrbass; Vanessa M. D'Souza

(57) ABSTRACT

An anti-bounce device (100) for a saw mill, the device including a strut (60) having a first end piece (50), a second end piece (51) and a resilient member (52) therebetween, the first end piece of the strut being moveable relative to the second end piece; an engagement means (40) associated with the strut (60) adapted to move across a surface of a material to be sawn, the engagement means (40) transferring force to the first end piece (50) of the strut and the resilient member (52) of the strut dampening relative movement between the first end piece (50) and the second end piece (51) of the strut thereby restraining movement of the engagement means (40) relative to the surface of the material to be saw, and connection means (70,80) for connecting the strut to the saw mill.

20 Claims, 6 Drawing Sheets

(56) References Cited

U.S. PATENT DOCUMENTS

| | | | |
|---|---|---|---|
| 5,046,391 A * | 9/1991 | Lewis et al. | 83/489 |
| 5,193,428 A | 3/1993 | Letendre | |
| 5,243,892 A * | 9/1993 | Jindra | 83/797 |
| 5,396,938 A * | 3/1995 | Cannaday | 144/357 |
| 5,442,984 A * | 8/1995 | Tate | 83/471.2 |
| 5,784,941 A * | 7/1998 | Sanborn | 83/794 |
| 5,819,626 A * | 10/1998 | Lucas | 83/489 |
| 6,470,932 B1 * | 10/2002 | Grivna et al. | 144/373 |
| 7,530,298 B2 * | 5/2009 | Peterson | 83/473 |
| D638,040 S * | 5/2011 | Dale | D15/127 |
| D639,319 S * | 6/2011 | Dale | D15/127 |
| 7,971,612 B2 * | 7/2011 | Lapointe | 144/357 |
| 2002/0144582 A1 * | 10/2002 | He | 83/473 |
| 2005/0028660 A1 | 2/2005 | Chin-Chin | |
| 2006/0179982 A1 * | 8/2006 | Fenton et al. | 83/13 |
| 2007/0234869 A1 * | 10/2007 | Dale et al. | 83/797 |
| 2010/0180985 A1 * | 7/2010 | Burton | 144/2.1 |
| 2011/0278780 A1 * | 11/2011 | Lucas | 269/97 |

* cited by examiner

ANTI-BOUNCE DEVICE

FIELD OF THE INVENTION

This invention relates to an anti-bounce device for saw mills. The device has particular application with portable saw mills.

BACKGROUND OF THE INVENTION

Such saw mills generally include a frame which straddles a log to be milled. The frame will typically include a pair of rails or tracks which in use extend longitudinally along the log. A carriage is mounted for movement along the rails or tracks. The carriage typically carries an engine, gearbox and saw blade. The saw mill can be of a swing blade type which permits the blade to be moved to vertical and horizontal positions so that vertical and horizontal cuts can be made in the log as the carriage is moved along the rails or tracks.

A sawing device comprising a saw blade, which pivots through 90° to act in both the horizontal and vertical planes, is known. In such a sawing device, the saw is moved along the length of the material. Permanent and portable versions of such saw mills are available.

As can be appreciated, movement of the saw blade relative to the material being sawn, in any direction other than the desired cut direction, is undesirable. For instance, when making a longitudinal cut, either vertically or horizontally, movement of the blade in and out of the cut is to be avoided. If this form of shake, or bounce, can be avoided a significantly improved finish is possible on the sawn material and the tooth life of the saw blade will be lengthened.

The problem of bounce is particularly pronounced in portable saw mills, since the power head (which includes an engine, gearbox and saw blade) is not supported by as heavy or sturdy a frame as in the permanent saw mill. That is, the frame on which the saw blade is mounted provides less resistance to bounce in a portable saw mill.

Portable saw mills generally include a frame which straddles the material to be sawn. A carriage mounted on the tracks, and which carries the power head, allows movement of the saw blade along the material to be sawn. The track is typically a pair of rails that can be positioned vertically so that the depth of a vertical cut by the saw blade can be set. The depth of any horizontal cut is controlled by moving the frame, on which is mounted the power head and the saw blade, relative to the material to be sawn. Increasing the depth of the cut, and/or the length of the tracks between the ends pieces, each independently increases the likelihood of shake or bounce.

A well known portable saw mill of this type is described in Australian patent 688020, the disclosure of which is incorporated herein by way of specific reference. When such a device is used to make a vertical cut, one problem is that the saw blade moves up and down vertically as the carriage bounces. The result is that the saw blade intermittently comes off the floor of the vertical cut, which stresses the teeth of the saw blade and results in the depth of the cut being uneven. When such a device is used to make a horizontal cut, one problem is again that the saw blade moves left and right.

The invention will be described with reference to portable saw mills but the skilled person will appreciate its applicability to permanent saw mills in certain circumstances. The object of the invention is to reduce the above-described undesirable movement of saw blades in saw mills.

Reference to any prior art in the specification is not, and should not be taken as, an acknowledgment or any form of suggestion that this prior art forms part of the common general knowledge in Australia or any other jurisdiction or that this prior art could reasonably be expected to be ascertained, understood and regarded as relevant by a person skilled in the art.

SUMMARY OF THE INVENTION

In one aspect of the invention there is provided an anti-bounce device for a saw mill, the device comprising
   a strut having a first end, a second end, and a resilient member therebetween, the first end of the strut being moveable relative to the second end;
   an engagement means associated with the strut adapted to move across a surface of a material to be sawn, the engagement means transferring force to the strut, the resilient member of the strut dampening relative movement between the first end and the second end of the strut; and
   connection means for connecting the strut to the saw mill.

In another aspect of the invention there is provided a saw mill for sawing material comprising
   a pair of rails or tracks and a carriage mounted on the rails/tracks for movement therealong, the carriage comprising a saw blade mount from which a driven saw blade is adapted to cut material as the carriage moves along the rails/tracks; the saw mill being characterized by an anti bounce device; the anti bounce device comprising
   a strut having a first end, a second end, and a resilient member therebetween, the first end of the strut being moveable relative to the second end
   connection means for connecting a strut to the saw mill; and
   an engagement means associated with the strut adapted to move across a surface of a material to be sawn as the carriage is moved, the engagement means transferring force to the strut and the resilient member of the strut dampening relative movement between the first end and the second end of the strut thereby restraining movement of the engagement means relative to the surface of the material to be sawn.

In the simplest embodiments, the strut may be the resilient member. For instance, the strut may be a spring, where movement of the first end of the spring towards the second end of the spring causes compression and the spring to be in a stressed state. The strut may be a shock absorber as commercially available and known.

In preferred embodiments, the strut includes a first tubular member having a first end and a second tubular member having a second end, one tubular member received within the other tubular member in a sliding engagement. In these embodiments, the 'ends' of the first and second tubular members need not be a physical end but may in their broadest form be any portion of the tubular member that in use can engage and transfer force to the resilient member. For instance, the end may be a physically closed end of the tubular member, an internal protrusion within the tubular member against which an end of the resilient member abuts during use, or a hole in the side of the tubular member through which part of the resilient member may pass. To result in a telescoping sliding engagement the first and second tubular members are preferably of co-operating cross-sectional shape. The tubular members need not be of circular cross-sectional shape. Preferably, the tubular members have an angular cross-sectional shape. More preferably, the tubular members have a rectangular or square cross-sectional shape. The resilient member can be positioned within the first tubular member and/or second tubular member, and can be acted upon by both the first end and the second end. Pressure on one tubular member will cause telescoping movement of the two tubular members towards each other and will stress the resilient member therebetween. In this state the strut is referred to as being in a stressed state. Release of pressure will permit movement of the two tubular members away from each other and will relax such stress. In this state the strut is referred to as being in a relaxed state.

The resilient member may be, for instance, a piece of rubber, compressed gas, compressible liquid, or a spring in combination with a hydraulic dampener. The resilient member may be a gas spring/hydraulic dampener. or a conventional spring/hydraulic dampener. as known to those skilled in the art.

The engagement means is associated with the strut in that both move together with movement of the carriage and forces transferred from the surface of the material to be cut to the engagement means are further transferred to the strut, thus compressing it to a stressed state. Preferably, the engagement means is positioned directly in line with the longitudinal direction of the strut so that force is directly transferred. Preferably, the engagement means is a wheel that runs along the surface of the material to be cut as the carriage is moved along the track.

In preferred embodiments, the engagement means is a wheel or roller where the surface of the wheel that rolls over another surface has a central ridge or rib running circumferentially thereabout and extending therefrom. The purpose of the ridge is to allow the wheel to slot into an already made vertical cut, and thus reduce horizontal shake of the saw blade, when making a subsequent horizontal cut. Thus, in embodiments including a ridge for this purpose, the ridge is necessarily of smaller thickness than, but is more preferably commensurate with, the width of the cut made by the saw blade.

In other preferred embodiments, the anti-bounce device further includes a guide disposed adjacent the engagement means, but vertically above the level of the engagement means and, and preferably vertically between the level of the engagement means that engages the surface of the material to be sawn and the lower end of the strut. The purpose of the guide is to assist with placing the resilient member in a stressed state when in use, ie when the engagement means is engaged with a surface of the material to be sawn.

The connection means may be for connecting the strut to the carriage or to some component carried by the carriage. Preferably, the strut is connected to the carriage. By connected it is not meant to exclude the strut being integrally formed with, ie a part of, the carriage. In preferred embodiments, the connection means are such that the position of the engagement means with respect to the saw blade can be adjusted. In these embodiments, it is preferable that both the vertical and horizontal displacement of the engagement means, from say the centre of the saw blade, is adjustable. For instance, the connection means may include a first component for adjusting the horizontal displacement and a second component for adjusting the vertical displacement. In these embodiments, the first component may engage both the carriage and the second component, and the second component may engage the strut. Preferably, and to achieve maximum effectiveness from the strut, the strut is in use aligned so that it is vertically parallel with the saw blade. That is, the motion of the first end towards the second end is in a direction that is vertically parallel to the saw blade bounce movement.

Preferably, the carriage also carries a saw. The anti-bounce device can be connected to the carriage at any position that allows it to travel along the surface of the material to be sawn at the same time as the blade moves through the material as it is sawn. That is, the anti-bounce device, or more particularly the engagement means, need not be in longitudinal alignment with the saw blade, and thus need not travel the same path on the material being sawn. For instance, the anti-bounce device can be offset from the saw blade. Importantly, the transverse displacement of the engagement means from the saw blade must not be such that one or the other does not contact the material being sawn when in use. More preferably, the transverse positioning of the anti-bounce device is adjustable by having the connection means movable across the transverse direction of the carriage.

The saw mill can be any as known in the art. Preferably, the saw mill is a portable saw mill. Such a saw mill most typically includes 2 substantially parallel rails or tracks and the carriage is adapted to engage and move along both rails or tracks simultaneously. A particularly preferred saw mill is described in Australian patent 688020.

The anti-bounce device may be used for any suitable sawing application, for instance, concrete, metal, plastic or wood. Preferably, the material to be sawn is wood. More preferably, the material to be sawn is a log.

As used herein, except where the context requires otherwise, the term "comprise" and variations of the term, such as "comprising", "comprises" and "comprised", are not intended to exclude further additives, components, integers or steps.

DETAILED DESCRIPTION OF THE EMBODIMENTS

In this specification, the terms vertical and horizontal are used as references to the direction of the cut and the anti-bounce device is described in relation to a saw mill where it is bounce in the direction of the cut (both horizontal and vertical) that is to be avoided.

The following description and reference to a saw mill suitable for use with the anti bounce device of the invention is intended for illustration purposes only and is not intended to be limiting of the features of the saw mill to which the invention is applicable. The invention is particularly applicable to saw mills having a pair of rails or tracks and a carriage mounted on the rails or tracks for movement therealong. The carriage comprises a saw blade mount from which a driven saw blade is adapted to cut material as the carriage moves along the rails or tracks.

Figure 6:
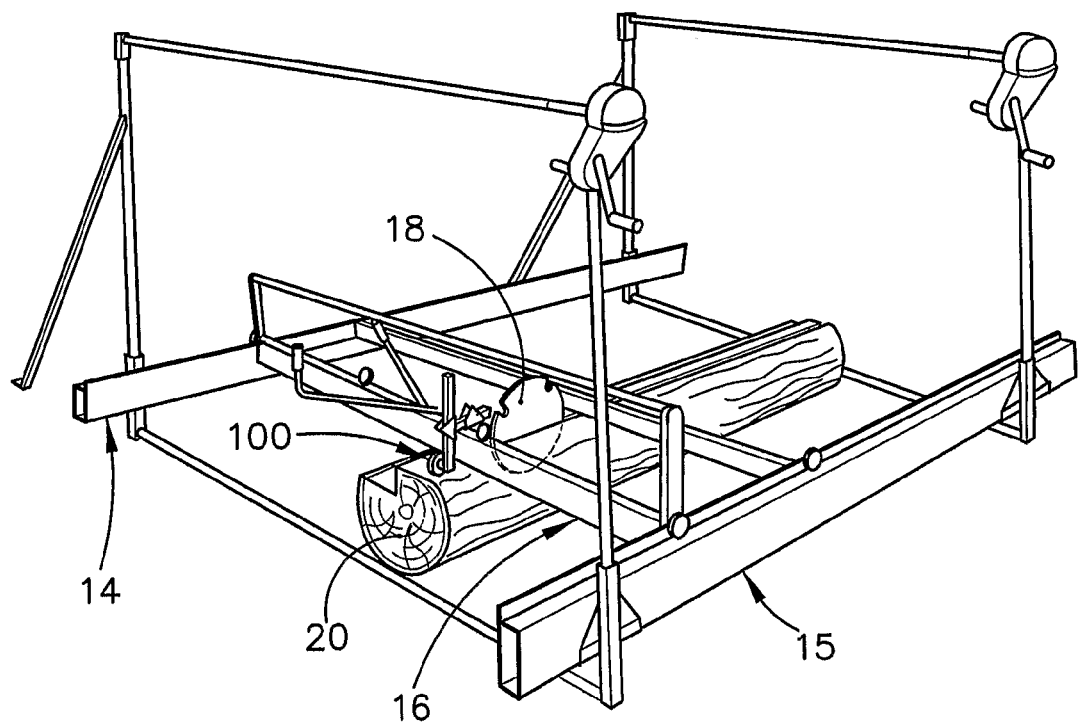
FIG. 6 is an isometric perspective schematic of a portable saw mill including an anti-bounce device in accordance with an embodiment of the anti-bounce device of the present invention.

Referring first to FIG. 6, an embodiment of a preferred form of portable saw mill 10 can be seen including end pieces 12, 13, and tracks 14, 15 extending longitudinally therebetween. Carriage 16 extends transversely and is engaged to tracks 14, 15 such that it is movable towards and away from the end pieces. Carriage 16 carries a saw 18 and the anti-bounce device 100 of the present invention. Movement of carriage 16 along the tracks 14, 15 allows for movement of the saw 18 along the material to be sawn 20 (in this case a log). The engagement means 40 of the anti-bounce device 100 also moves along the surface of beam 20.

Figure 1:
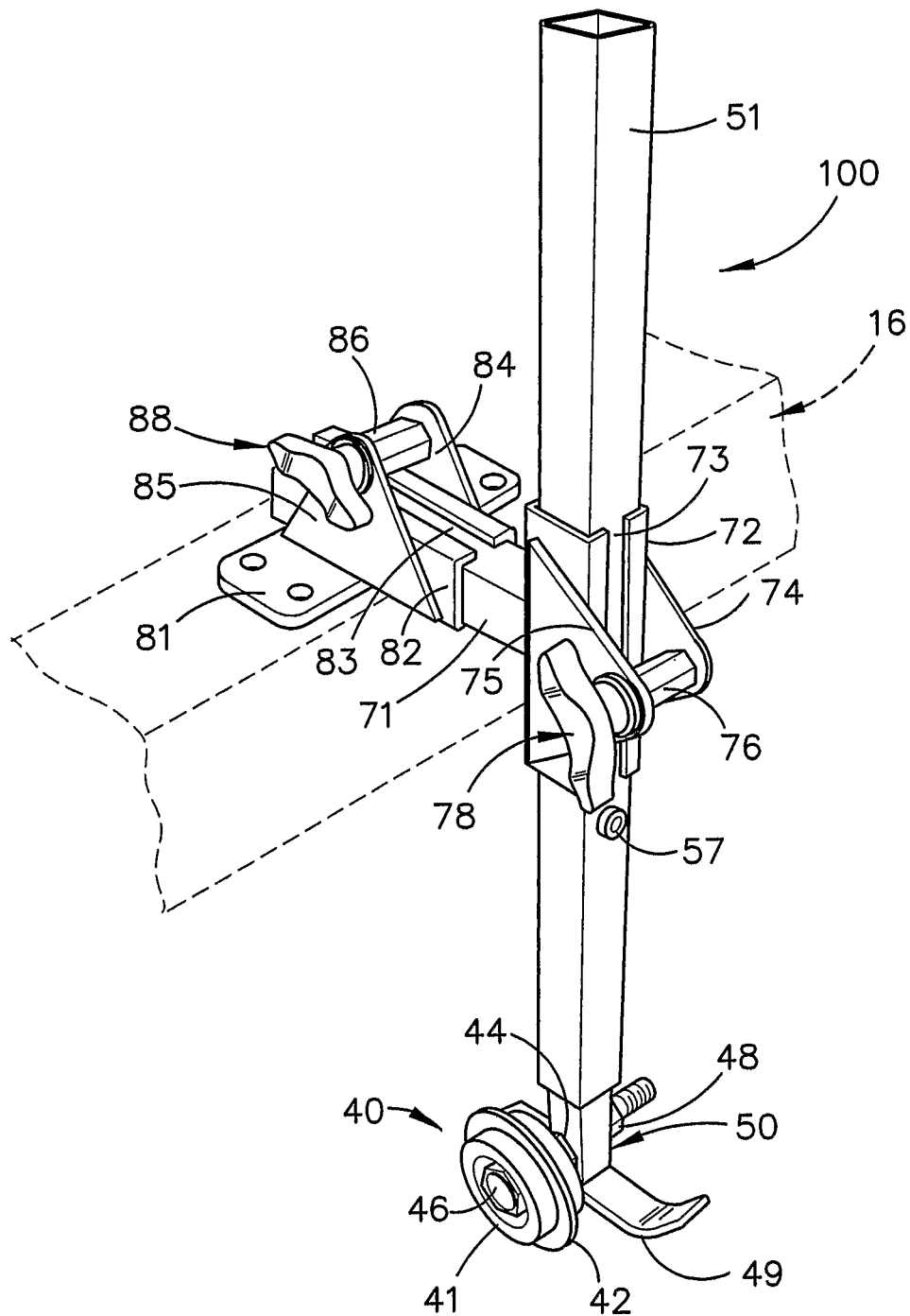
FIG. 1 is an isometric perspective view of an embodiment of the anti-bounce device of the present invention.
Figure 2:
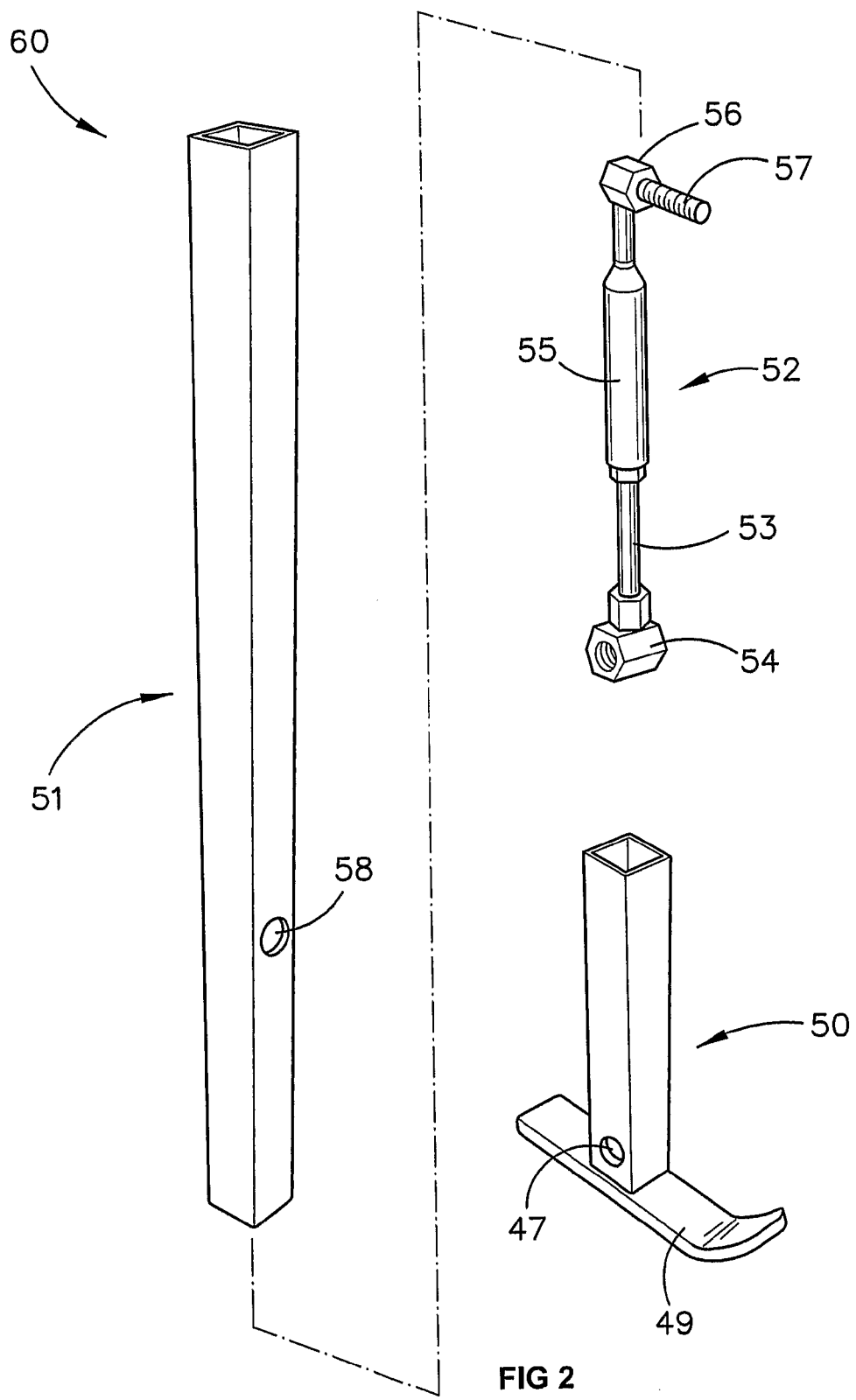
FIG. 2 is an exploded isometric perspective view of a first tubular member including a guide, a second tubular member, and a strut in accordance with an embodiment of the anti-bounce device of the present invention.

The anti-bounce device 100 is shown in more detail in FIGS. 1 to 5. In FIG. 1, the assembled anti-bounce device 100 is shown. Engagement means 40 includes a wheel 41 attached to a first tubular member 50 of strut 60. The wheel includes ridge 42. The first tubular member 50 is slidingly engaged with second tubular member 51 of strut 60. Resilient member 52 of strut 60 is disposed within first tubular member 50 and second tubular member 51. The relationship between resilient member 52, first tubular member 50 and second tubular member 51 is best seen in FIG. 2.

Figure 5:
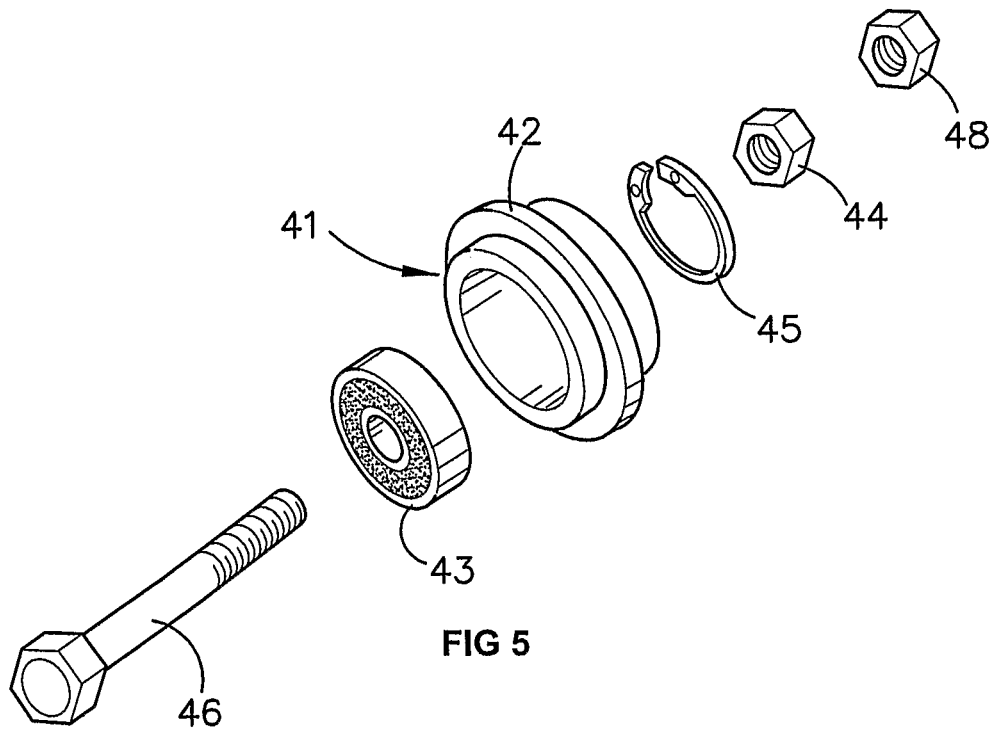
FIG. 5 is an exploded isometric perspective view of an engagement means in accordance with an embodiment of the anti-bounce device of the present invention.

The wheel 41 is attached to first tubular member 50 by a nut and bolt combination as shown in FIG. 5. A bearing 43 engages in the centre of the wheel 41. The end of the inner race of the bearing 43 is engaged against a nut 44, with a washer 45 being therebetween. When bolt 46 in first tubular member 50 is engaged through opening 47 it can be adjusted in and out and locked against the wall of the first tubular member 50 with lock nut 48 (FIG. 1).

Resilient member 52, which in this embodiment is a gas spring, has a rod 53 with a nut 54 fitted thereto. The rod 53 is engaged, when the anti-bounce device 100 is assembled, in the first tubular member 50 so that the bolt 46 for attaching the wheel passes through nut 54 to thereby anchor the rod 53.

The body 55 of the shock absorber device 52 is received in the second tubular member 51. The end of the body 55 has a nut 56 into which a grub screw 57 can be engaged. The nut 56 is, when the anti-bounce device 100 is assembled, aligned with opening 58 in the second tubular member 51 and the grub screw 57 screwed in to thereby anchor the body 55 in the second tubular member 51. The first tubular member 50 and second tubular member 51 are thereby coupled together by the resilient member 52 to form the strut 60.

The first tubular member 50 is dimensionally smaller but of similar cross sectional shape to the second tubular member 51 so it can fit, optionally with clearance, in second tubular member 51. Due to the angular cross sectional shape of the arrangement substantially no twisting of the first tubular member 50 with respect to the second tubular member 51 can occur.

Figure 3:
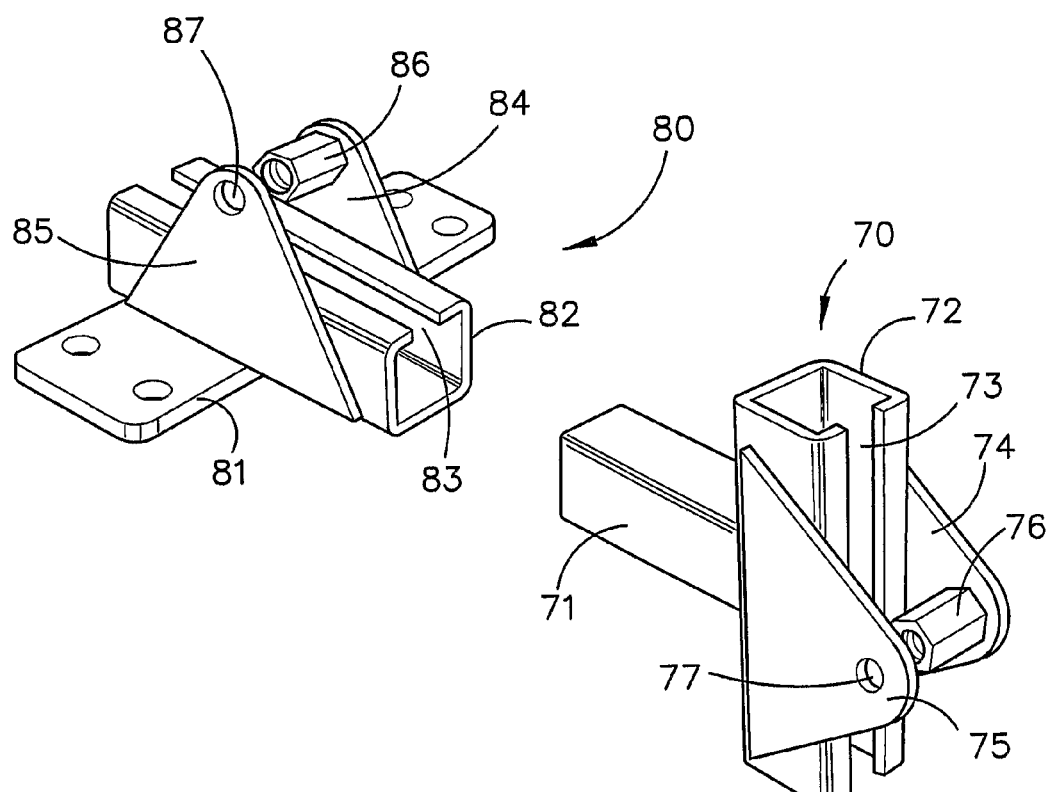
FIG. 3 is an exploded isometric perspective view of a first component, for adjusting the horizontal displacement, and a second component, for adjusting the horizontal displacement, of a connection means in accordance with an embodiment of the anti-bounce device of the present invention.

The connection means are best illustrated in FIGS. 1 and 3. Here, a first component 70 (referred to as a strut mount 70) and a second component 80 (referred to as a carriage mount 80) are shown. The strut mount 70 is adapted to encompass second tubular member 51 and provides for vertical adjustment of the anti-bounce device 100 relative to the saw 18. The carriage mount 80 is adapted to encompass a portion of the strut mount 70 and engage the carriage 16 and provides for horizontal adjustment of the anti-bounce device 100 relative to the saw 18.

The strut mount 70 has a tongue 71 which extends transverse to a tubular section 72 which has a longitudinal slot 73 cut in one wall. The slot 73 forms a clearance for the head of the grub screw 57 which protrudes from second tubular member 51, as well as allowing for compression of the tubular section 72 to provide a clamping action on the second tubular member 51.

Figure 4:
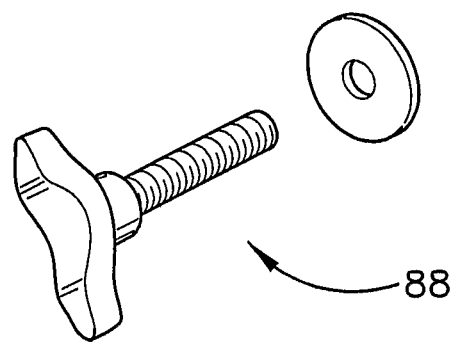
FIG. 4 is an exploded isometric perspective view of a T-bolt fixing for the first and second components of FIG. 3.

The tubular section 72 carries on opposed walls flanges 74, 75. One flange 74 has fastened thereto a nut 76 which is opposite an opening 77 in the other flange 75. A fastener 78 of the T-bolt type illustrated in FIG. 4 is engaged though opening 77 and into nut 76 as is shown in assembled form in FIG. 1. Thus with the second tubular member 51 slidingly received in tubular section 72 of the strut mount 70, the position of the strut 60 (and engagement means 40) can be adjusted vertically before the fastener 78 is tightened to cause the tubular section 72 to clamp the strut mount 70 in place.

The carriage mount 80 is of a similar construction as the strut mount 70. In place of the tongue 71 of the strut mount 70, the carriage mount 80 has a mounting plate 81. This mounting plate 81 permits the carriage mount 80 to be fixed in place on the carriage 16 of the saw mill 10. In this embodiment the carriage mount is positioned such that the engagement means is in alignment with the saw blade and the direction of the intended cut. As well, the carriage mount 80 shown is of the un-adjustable kind, but the skilled person would understand how to make this mount adjustable. The mounting plate 81 is connected to a tubular section 82 which has a longitudinal slot 83 cut in one wall. The slot allows for compression of the tubular section 82 to provide a clamping action on the tongue 71 of the strut mount 70, which is received therein.

The tubular section 82 carries on opposed walls flanges, 84, 85. One flange 84 has fastened thereto a nut 86 which is opposite an opening 87 in the other flange 85. A fastener 88 of the T-bolt type illustrated in FIG. 4 is engaged though opening 87 into nut 86 as is shown in assembled form in FIG. 1. Thus with the tongue 71 of the strut mount 70 slidingly received in tubular section 82 of the strut mount 70, the position of the strut 60 (and engagement means 40) can be adjusted horizontally before the fastener 88 is tightened to cause the tubular section 82 to clamp the strut mount 70 in place.

In use, the wooden beam 20 is position beneath the path of carriage 16 and saw blade 18. The horizontal position of the strut 60 and engagement means 40 relative to the saw blade is adjusted so that free movement of the saw blade is allowed. The vertical position of the strut 60 and engagement means 40 relative to the surface of beam 20 along which the engagement means 40 runs is adjusted so that before the engagement means 40 actually engages the beam 20 it is lower than the surface. Thus, as the carriage 16 is moved towards an end of the beam 20, the resilient member 52 in strut 60 must be compressed to a stressed state to allow the engagement means 40 to move up onto the surface of beam 20. The resilient member 52 will remain in a stressed state as carriage 16 and saw blade 18 moves along the remainder of the beam 20 making the cut. Any bouncing of the carriage 16 will be lessened/dampened by the presence of the anti-bounce device 100 in a stressed state. The skilled person will appreciate the mechanism by which this lessening occurs. The effect of the anti-bounce device 100 is better shown in FIG. 7.

Figure 7A:
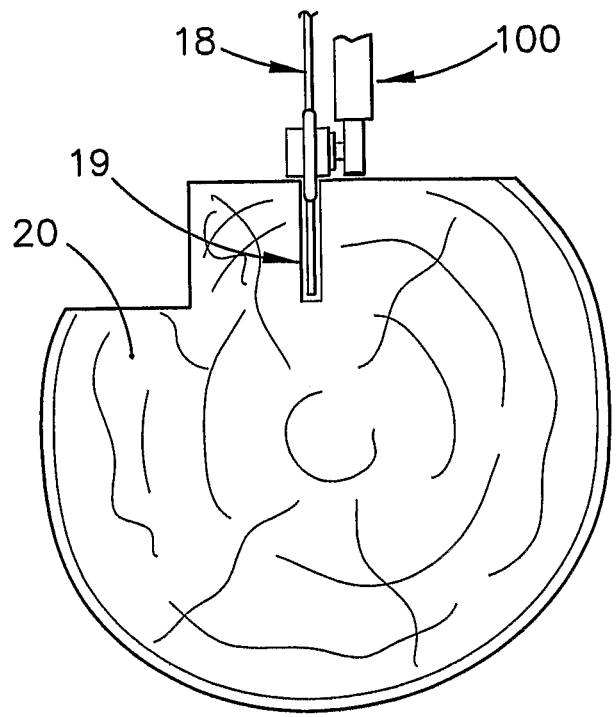
FIG. 7 is a schematic showing the effect of the anti-bounce device 100 in both vertical (A) and horizontal (B) cutting regimes.
Figure 7B:
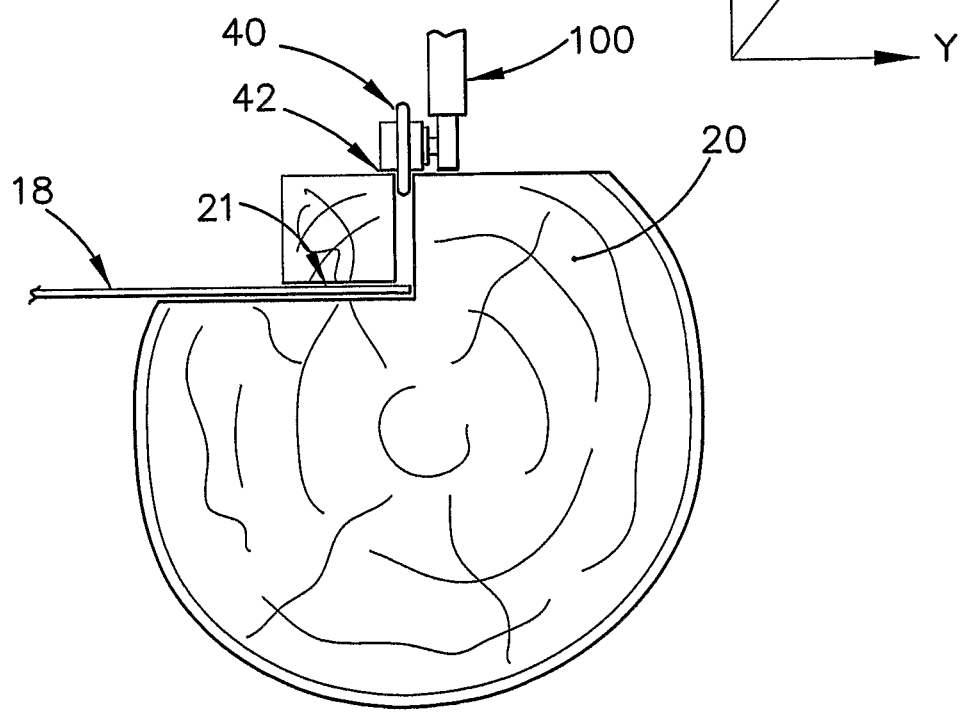

Referring to FIG. 7, as the saw blade 18 progresses in the z direction into and out of the page the carriage is prone to bouncing (which are also in the z direction). As in FIG. 7A, if a vertical cut is being made (ie the saw blade 18 is in a vertical position), the anti-bounce device 100 (not shown in FIG. 7A) lessens movement of the saw blade up and down vertically in the x direction as the carriage and track bounces. The saw blade less often comes off the floor of the vertical cut 19, which reduces stress on the teeth of the saw blade and results in the depth of the cut being more even. As in FIG. 7B, if a horizontal cut is being made (ie the saw blade 18 is in a horizontal position), the anti-bounce device 100 lessens movement of the saw blade in the y direction (left and right). Horizontal movement of the saw blade in the y direction is lessened due to positioning ridge 42 of engagement means 40 within the cut 19.

The anti-bounce device can be connected to the carriage at any position that allows it to travel along the surface of the material to be sawn at the same time as the blade moves through the material as it is sawn. That is, the anti-bounce device, or more particularly the engagement means, need not be in longitudinal alignment with the saw blade, and thus need not travel the same path on the material being sawn. For instance, the anti-bounce device can be offset from the saw blade. Importantly, the transverse displacement of the engagement means from the saw blade must not be such that one or the other does not contact the material being sawn when in use. More preferably, the transverse positioning of the anti-bounce device is adjustable by having the connection means movable across the transverse direction of the carriage.

In the embodiment shown in FIGS. 2 and 3, a guide 49 is shown disposed adjacent the engagement means 40 and as part of first tubular member 50. The guide 49 is positioned vertically above the level of the engagement means that engages the surface of the material to be sawn. With the anti-bounce device 100 fixed to the carriage 16 the strut 60, and thus guide 49, is vertically adjustable. Accordingly, when the saw 18 is arranged to proceed with cutting, the strut 60 is lowered so that the guide 49 touches the top of the beam 20. When the cut of beam 20 commences the engagement means 40 must then 'step up' onto the log, which pushes the first end of the strut 50, 54 towards the second end of the strut 51, 56, thus compressing the resilient member 52 therebetween. This establishes a restorative force in the strut 60 that acts on the engagement means 40 and to dampen up and down bounce of the saw blade 18.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A saw mill for sawing material including:
a pair of rails or tracks and a carriage mounted on the rails or tracks for movement therealong, the carriage comprising a saw blade mount from which a driven saw blade is adapted to cut material as the carriage moves along the rails or tracks; the saw mill being characterized by an anti bounce device; the anti bounce device comprising:
a strut having a first end, a second end, and a resilient member therebetween, the first end of the strut being moveable relative to the second end;
connection means for connecting the strut to the saw mill; and
an engagement means associated with the strut adapted to move across a surface of a material to be sawn as the carriage is moved, the engagement means transferring force to the strut and the resilient member of the strut dampening relative movement between the first end and the second end of the strut thereby restraining movement of the engagement means relative to the surface of the material to be sawn.

2. The saw mill of claim 1, wherein the strut is connected to the carriage by the connection means.

3. The saw mill of claim 1, further including a saw having a saw blade.

4. The saw mill of claim 3, wherein the connection means is such that the position of the engagement means with respect to the saw blade can be adjusted.

5. A saw mill for sawing material including:
a pair of rails or tracks and a carriage mounted on the rails or tracks for movement therealong, the carriage comprising a saw blade mount from which a driven saw blade is adapted to cut material as the carriage moves along the rails or tracks; the saw mill being characterized by an anti bounce device; the anti bounce device comprising:
a strut having a first end, a second end, and a resilient member therebetween, the first end of the strut being moveable relative to the second end;
a strut mount for connecting the strut to the saw mill; and
an engagement wheel associated with the strut adapted to move across a surface of a material to be sawn as the carriage is moved, the engagement wheel transferring force to the strut and the resilient member of the strut dampening relative movement between the first end and the second end of the strut thereby restraining movement of the engagement wheel relative to the surface of the material to be sawn.

6. A saw mill for sawing material including:
a pair of rails or tracks and a carriage mounted on the rails or tracks for movement therealong, the carriage comprising a saw blade mount from which a driven saw blade is adapted to cut material as the carriage moves along the rails or tracks; the saw mill being characterized by an anti bounce device; the anti bounce device comprising:
a strut having a first end, a second end, and a resilient member therebetween, the first end of the strut being moveable relative to the second end;
a strut mount and carriage mount for connecting the strut to the carriage; and
an engagement wheel associated with the strut adapted to move across a surface of a material to be sawn as the carriage is moved, the engagement wheel transferring force to the strut and the resilient member of the strut dampening relative movement between the first end and the second end of the strut thereby restraining movement of the engagement wheel relative to the surface of the material to be sawn.

7. The saw mill of claim 6, further including a saw having a saw blade.

8. The saw mill of claim 7, wherein the strut mount is such that the position of the engagement wheel with respect to the saw blade can be adjusted.

9. The saw mill of claim 8, wherein both the vertical and horizontal displacement of the engagement wheel from the saw blade is adjustable.

10. The saw mill of claim 7, wherein the strut is in use aligned so that it is vertically parallel with the saw blade.

11. The saw mill of claim 6, which is a portable saw mill.

12. The saw mill of claim 6, wherein the strut is the resilient member.

13. The saw mill of claim 12, wherein the strut is a commercially available gas strut.

14. The saw mill of claim 6, wherein the strut further includes a first tubular member having the first end and a second tubular member having the second end, the first tubular member received within the second tubular member in a sliding engagement.

15. The saw mill of claim 14, wherein the tubular members have an angular cross-sectional shape.

16. The saw mill of claim 14, wherein the resilient member is positioned within the first tubular member and/or second tubular member.

17. The saw mill of claim 6, wherein the resilient member is selected from the group consisting of rubber, compressed gas, compressible liquid, a spring, in combination with hydraulic dampener or a commercially available gas strut (gas spring/hydraulic dampener).

18. The saw mill of claim 6, wherein the wheel runs along the surface of the material to be cut as the carriage is moved along the track, and the wheel has a central ridge running circumferentially thereabout and extending therefrom.

19. The saw mill of claim 18, wherein width of the central ridge is commensurate with the width of a cut made by a saw blade of the saw mill.

20. The saw mill of claim 6, wherein further includes a guide disposed adjacent to, but vertically above the level of the engagement means.

\* \* \* \* \*